D. SMITH.
AIRSHIP ATTACHMENT.
APPLICATION FILED DEC. 12, 1918.

1,303,976.

Patented May 20, 1919.
2 SHEETS—SHEET 1.

Witness

Inventor,
David Smith
By [Attorneys]

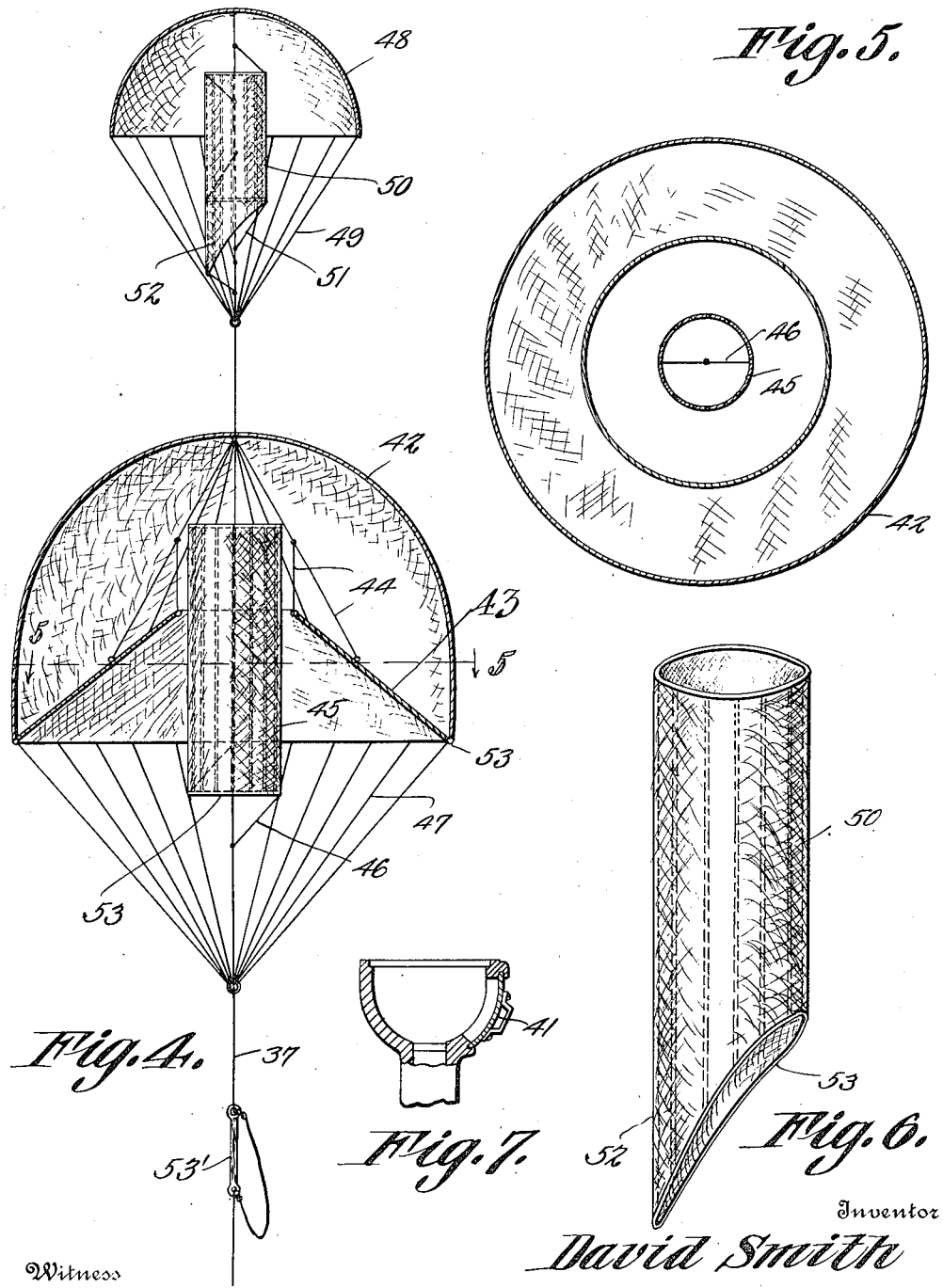

UNITED STATES PATENT OFFICE.

DAVID SMITH, OF DOUGLAS, WYOMING.

AIRSHIP ATTACHMENT.

1,303,976.  Specification of Letters Patent.  Patented May 20, 1919.

Application filed December 12, 1918. Serial No. 266,445.

*To all whom it may concern:*

Be it known that I, DAVID SMITH, a citizen of the United States, residing at Douglas, in the county of Converse and State of Wyoming, have invented a new and useful Airship Attachment, of which the following is a specification.

This invention relates to airships and more especially to a parachute attachment therefor whereby the descent of an airship can be retarded in an emergency to allow a safe landing or even, under some circumstances, to permit quick repairs or the starting of a stalled engine before the airship reaches the ground. One of the objects is to provide a parachute having means whereby it is forcibly ejected from the machine by an explosive charge and will open automatically, additional means being provided for returning the parachute to the machine when it is desired to continue the flight. A further object is to provide a parachute of novel construction which is of maximum efficiency.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Fig. 4 is a vertical section through the extended parachute.

Fig. 5 is a section on line 5—5, Fig. 4.

Fig. 6 is a detail view of the air tube of the upper member of the parachute.

Fig. 7 is a section through a modified form of parachute ejecting gun.

Figure 1:
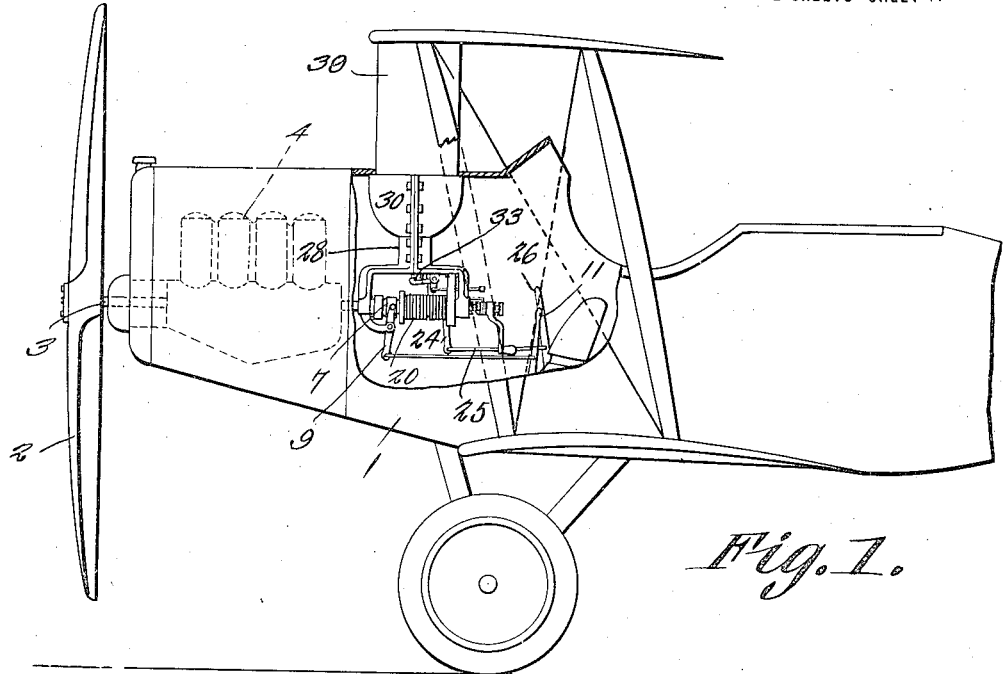
Figure 1 is a view partly in side elevation and partly in section of an airship having the present improvements combined therewith, only a portion of the airship being shown.
Figures 2, 3:
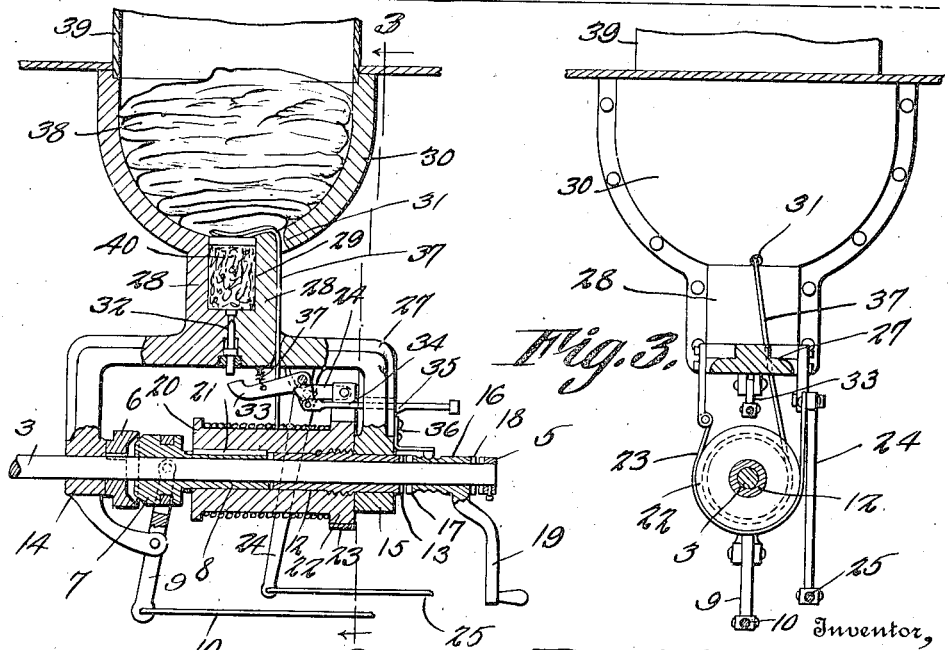
Fig. 2 is an enlarged vertical longitudinal section through the parachute ejecting means and the means for housing the parachute, said parachute being shown in its normal or housed position.
Fig. 3 is a section on line 3—3, Fig. 2.

Referring to the figures by characters of reference, 1 designates the body of an airship having a propeller 2 secured to a shaft 3 which extends rearwardly from the engine 4 and has a collar 5 provided with a clutch face, as shown. A friction clutch member 6 is secured to the shaft and is adapted to be engaged by a clutch member 7 at one end of a sleeve 8 mounted freely on the shaft 3 and adapted to slide thereon. Clutch member 7 is engaged by a forked lever 9 which is connected by a rod 10 to an operating lever 11. A sleeve 12 is mounted for rotation on the shaft 3 and is provided at its rear end with a clutch member 13. A bearing 14 is provided for shaft 3 close to the clutch member 6 and another bearing 15 is provided for the sleeve 12 close to the clutch member 13. A clutch member 16 having clutch faces 17 and 18 at its two ends, is slidable on shaft 3 between sleeve 12 and collar 5 and has a starting crank 19 extending therefrom. Parallel annular grooves are formed in this member 16 and a spring supported locking stud 36 is connected to bearing 15 and is adapted to be seated in any one of the grooves to hold member 16 in engagement with either the sleeve 12 or the collar 5. When in the first position the member 16 is coupled to the sleeve 12 while when in its other position it is coupled to shaft 3. Thus it will be seen that, by shifting the member 16 to one position the crank 19 can be used for rotating the shaft 3 and, by shifting the member to its other extreme position, it will couple member 16 to sleeve 12 for the purpose of rotating the sleeve by hand and independently of the shaft.

Secured to the sleeve 12 so as to rotate therewith is a windlass 20 and the sleeve 8 is slidably mounted in the windlass and is connected thereto by a spline 21. A head 22 is provided at one end of the windlass and constitutes a brake wheel. A brake band 23 is fastened at one end and extends partly around the brake wheel 22 and is secured to a bell crank lever 24, there being a rod 25 connecting this lever to an operating lever 26. Thus it will be seen that the rotation of the windlass can be controlled readily.

Mounted on the bearings 14 and 15 is a yoke 27 on which is mounted the gun constituting the housing and the ejector for the parachute portion of the invention. This gun is preferably formed of two opposed sections 28 bolted or otherwise fastened together and shaped to form a charge holding, cylindrical chamber 29 opening into a bowl shaped housing 30 having an opening 31 in the bottom thereof. A firing pin 32 is mounted in the bottom of the chamber 29 and is adapted to be struck by a hammer 33 in the form of a bell crank lever one arm of which is connected to a rod 34 having a lug 35 for engaging a keeper 36. A spring 37 connects the hammer 33 to the yoke 27 so that, when the lug on rod 34 is disengaged from its keeper, the spring will actuate the hammer and cause it to strike the firing pin 32.

A cable 37 is secured to and wound on the windlass 20 and extends through the yoke 27 and the opening 31 into the housing 30. The parachute, which has been shown generally at 38, is collapsed within the housing 30 and extending upwardly from the sides of each housing and through that portion of the airship thereabove is a flue 39 open at its upper end.

From the foregoing description it will be apparent that when it is desired to eject the parachute so as to retard the descent of the airship when out of control, the hammer 33 is released and will strike the firing pin 32 which, in turn will cause the charge 40 in the gun to be exploded. The parachute will therefore be ejected upwardly through the flue 39 and the cable 37 will unwind from the reel or windlass 20, the speed of rotation of the windlass being controlled by the brake band 23. If the engine is stalled, the member 16 can be shifted to engage the collar 5 and the crank 19 can be used for starting the engine. After the engine has been started the member 16 can be shifted into engagement with the sleeve 12 and the crank used for winding the cable on the windlass and drawing the parachute back to the gun where it can again be housed in the housing 30. If a quick rewind is desired, the member 7 can be moved into engagement with the member 6 and the rotating engine shaft 3 will thus rotate the windlass and cause the cable to wind thereon. Before replacing the parachute in the housing 30 a new charge of explosive can be placed in the gun. To facilitate the reloading a sliding door 41 can be arranged at the side of the housing, as shown in Fig. 7.

The parachute used in connection with the gun has been illustrated in detail in Figs. 4, 5 and 6. It is formed of an upper unit and a lower and larger unit, as shown in Fig. 4. The lower unit includes a substantially semi-spherical body of suitable fabric, as indicated at 42 and through the center of which extends the cable 37. Extending upwardly into the body 42 is a frusto-conical bottom 43 also formed of fabric and which is properly supported at its inner end within the body 42 by cables 44 fastened to the cable 37 at the point where it passes through the top of the body. These cables 44 also support a cylindrical air tube 45 formed of fabric and which extends through but is spaced from the bottom 43 and is concentric with the cable 37. The lower end of the tube is located below the bottom of the body and said tube is suitably connected by bracing ropes 46 to the cable 37. Cables 47 extend downwardly from the edge of the bottom of the parachute to the cable 37 and are fastened thereto.

Cable 37 extends upwardly from the body 42 to the upper unit of the parachute and is secured to the center of the semi-spherical body 48 of said unit. The edge of the body is connected to the cable 37 by downwardly converging cables 49 and extending into the body 48 and concentric with the cable 37 is an air tube 50 having suitable bracing ropes 51, as shown. The lower end of this tube has a scoop like extension 52, as shown. The edges of the various parts of the units of the parachute are stiffened, as by means of ropes secured thereto, and shown at 53.

When the parachute is ejected from its housing 30 and is drawn downwardly by the descending machine, air will rush upwardly through the tubes 45 and 50 and into the body portions of the two units, causing said portions to open out and act efficiently to retard the descent. For the purpose of absorbing shock, a spring 53' is secured in a loop of the cable 37, as shown.

What is claimed is:—

1. The combination with an airship, a windlass, a motor driven shaft, a crank thereon, means operated by the shifting of the crank in one direction for coupling the windlass to the crank, and, when moved in the opposite direction for coupling the crank to the shaft to rotate the shaft, means for coupling the shaft to the windlass, a parachute container, means for ejecting a parachute from the container and a cable upon the windlass and adapted to be unwound therefrom by the ejection of the parachute.

2. The combination with charge holding chamber and a bowl shaped extension at the outer end thereof, and means under the control of the aviator for exploding the charge, of a parachute normally collapsed within the bowl shaped extension, a cable extending therefrom and through an opening in the extension, a windlass on which the cable is normally wound, an engine driven shaft extending through the windlass, means under the control of the aviator for coupling the windlass to or uncoupling it from the shaft, a cranking device loosely mounted on said shaft, means engaged by said device when shifted in one direction, for coupling said device to the shaft and means engaged by said device when shifted in the opposite direction for coupling the device to the windlass, and means for holding the cranking device in any of its different positions.

3. A parachute for airships including upper and lower units, each including a dome-like body, an air tube supported within and concentric with each body, and a connecting cable extending through and connected to the tubes and bodies of the respective units, and a frusto-conical bottom within the body of one of the units and spaced from the tube thereof.

In testimony that I claim the foregoing as my own, I have hereto affixed my signature in the presence of two witnesses.

DAVID SMITH.

Witnesses:
 IVY E. SIMPSON,
 PHILOMENA A. ROCKELLI.